United States Patent [19]

Creech

[11] Patent Number: 4,707,898
[45] Date of Patent: Nov. 24, 1987

[54] BEAM PROFILE CUTTING MACHINE AND METHOD

[76] Inventor: Clyde W. Creech, 2243 W. South Mountain Ave., Phoenix, Ariz. 85009

[21] Appl. No.: 861,827

[22] Filed: May 12, 1986

[51] Int. Cl.[4] .................. B23P 17/00; B23K 7/00
[52] U.S. Cl. ............................. 29/155 R; 29/557; 29/DIG. 24; 83/DIG. 2; 148/9 R; 266/48
[58] Field of Search ............. 29/33 R, 34 R, 155 R, 29/557, DIG. 24; 83/14, 15, 170, 401, DIG. 2; 148/9 R; 266/48

[56] References Cited

U.S. PATENT DOCUMENTS 3,190,628  6/1965  Litzka ................... 83/DIG. 2 X
4,129,460 12/1978  Brolund et al. ............. 148/9 R
4,457,197  7/1984  Wepner et al. ......... 83/DIG. 2 X

FOREIGN PATENT DOCUMENTS 9256  3/1973  Japan ........................ 148/9 R

OTHER PUBLICATIONS

IK-60M:Compact, Manual H-Beam Cutting Machine, Cat. No. 30A11-2; Koike America, Inc.
IK-60A: Compact, Automatic H-Beam Cutting Machine, Cat. no. 30A10-2; Koike America, Inc.
Mini-Mantis II: Portable H-Shape Steel Gas Cutting Machine, Cat. No. 76051, K. N. Aronson, Inc.
Vernon, pub. no. BPM-83-5M, Vernon Tool Company, Oceanside, Calif. (Oct. 1983).

Primary Examiner—Howard N. Goldberg
Assistant Examiner—Ronald S. Wallace
Attorney, Agent, or Firm—Cahill, Sutton & Thomas

[57] ABSTRACT

A semi-automated beam cutting machine simultaneously cuts with two torches the flanges of the beam in a presettable plane in each of two axis. The web of the beam is cut with a further torch in response to a template, to obtain two rat holes and the inset web edge. Independent angular reorientation in a third plane of each of the flange cutting torches accommodates for lack of perpendicularity between each flange and the web to obtain a true edge and a constant width angle cut. The ends of two beams formed from a single beam can be cut in a single operation with appropriate adjustments to the machine. A method for performing various end cuts of a beam is disclosed.

21 Claims, 19 Drawing Figures

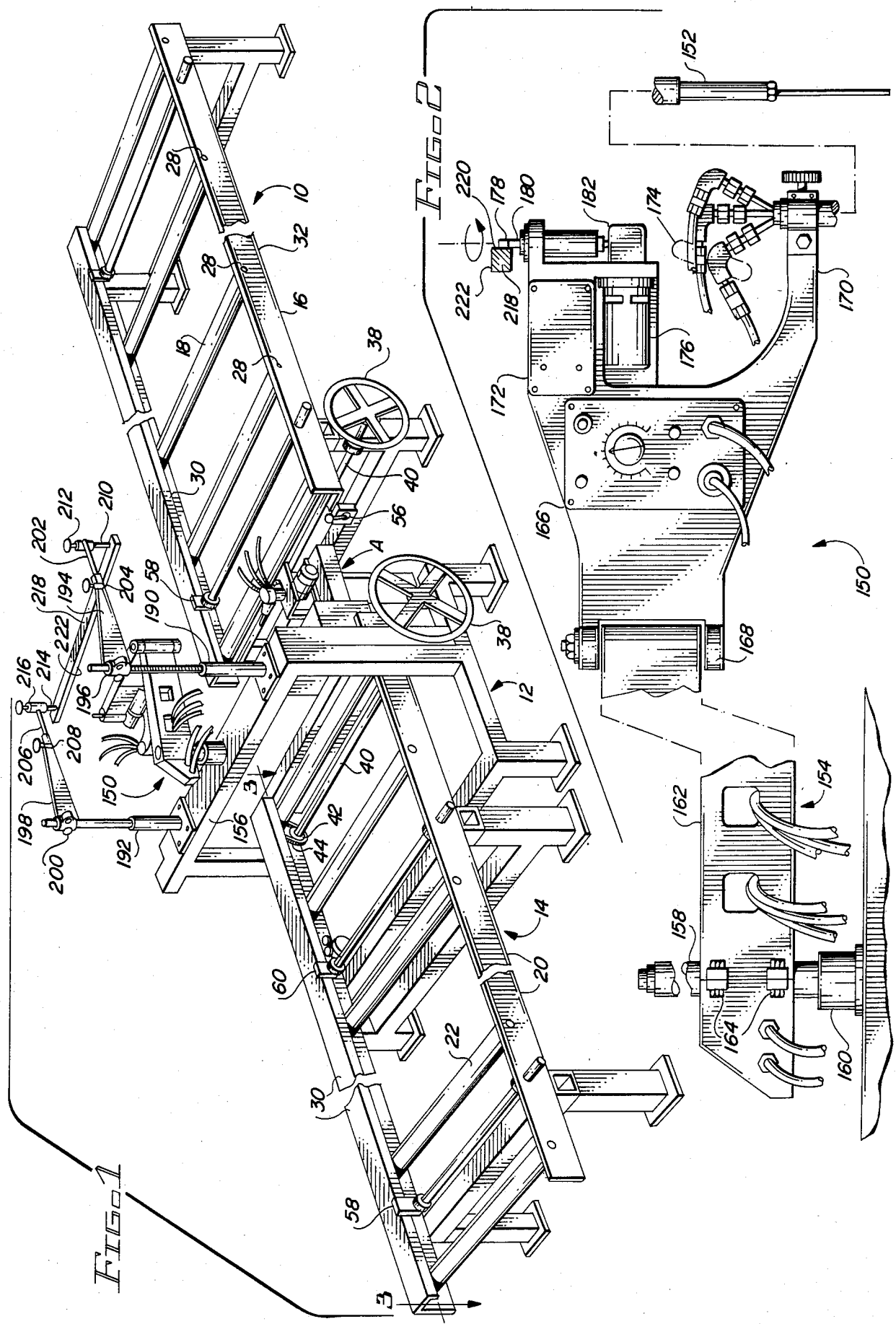

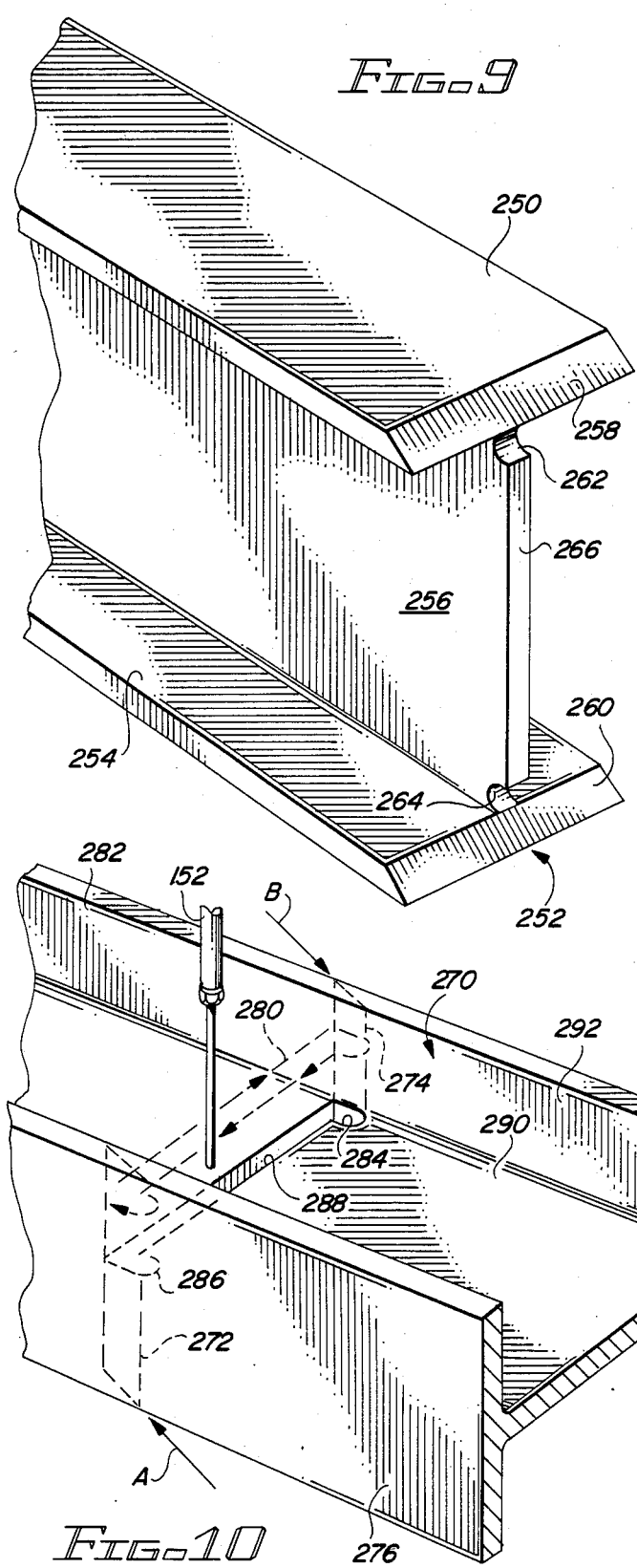
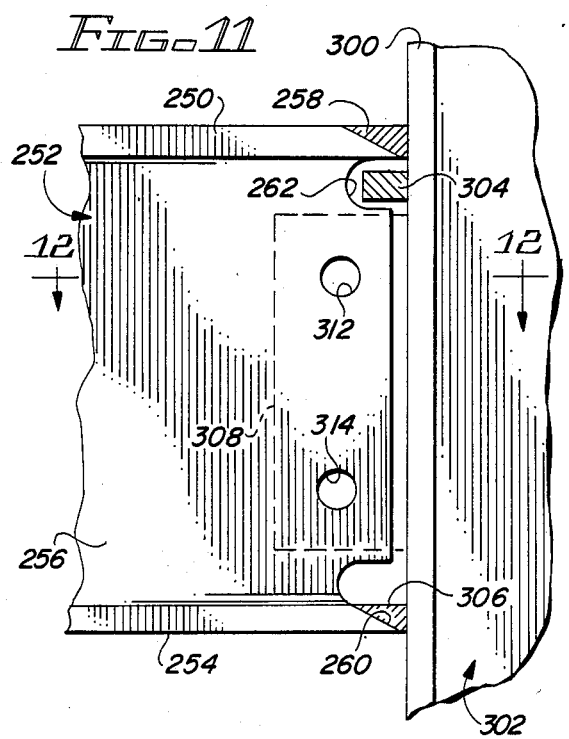
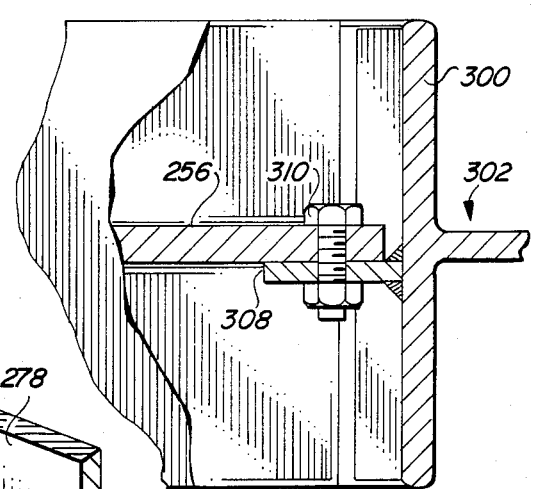
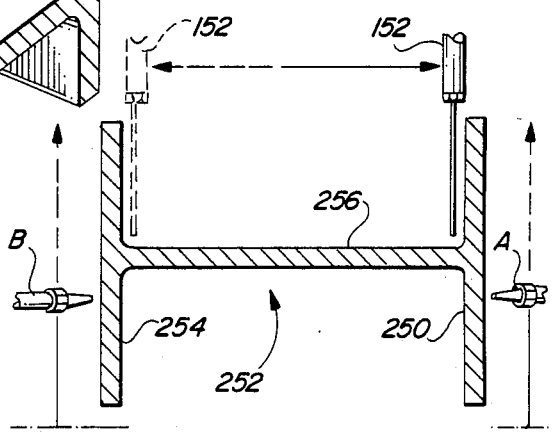

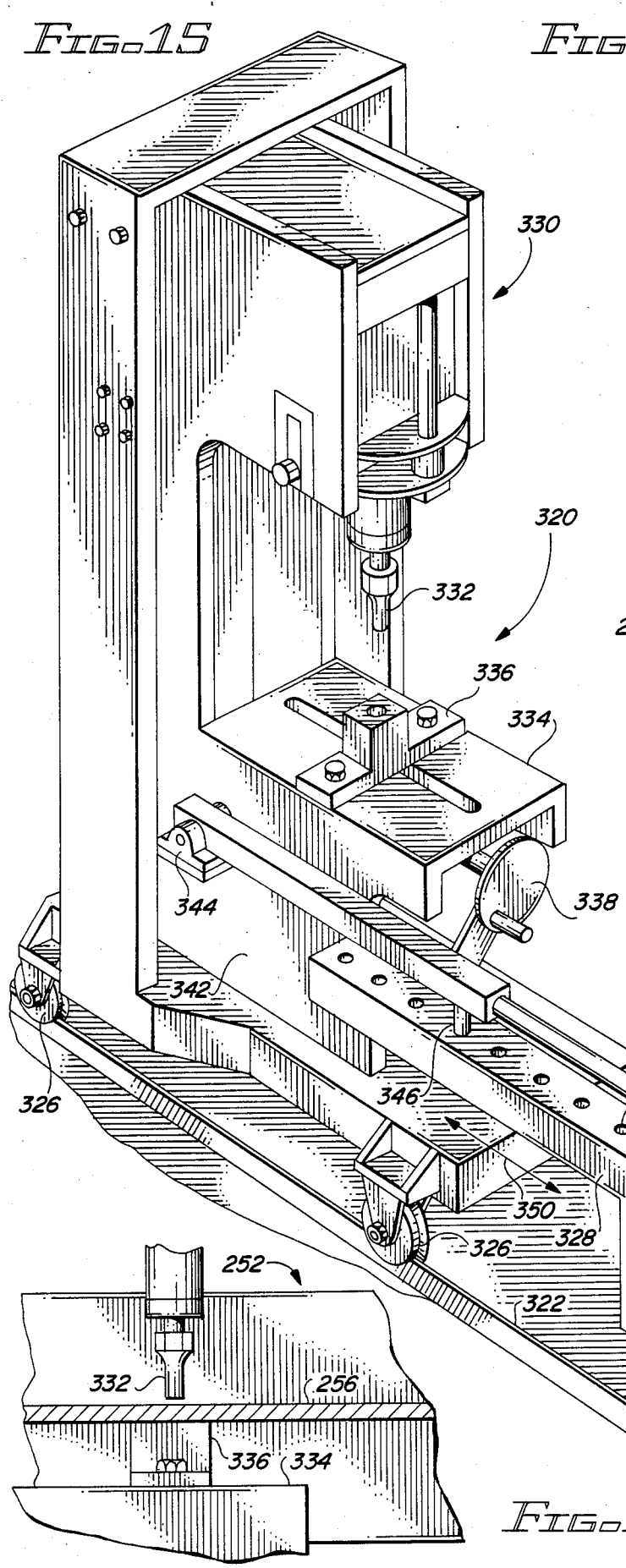
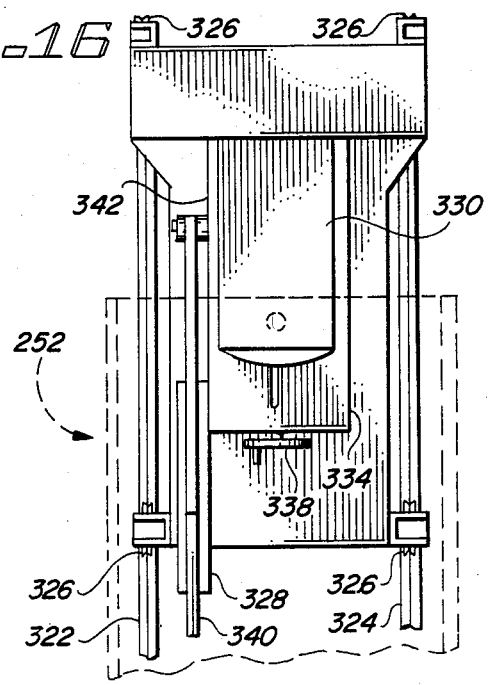
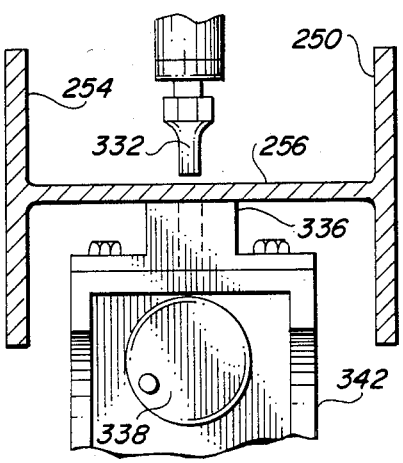
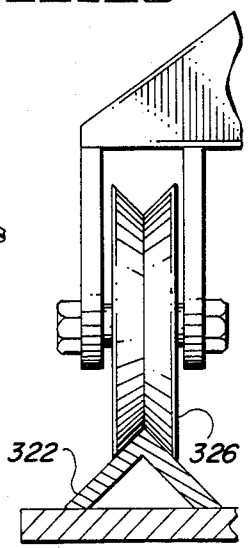
FIG.15 FIG.16 FIG.17 FIG.18 FIG.19

BEAM PROFILE CUTTING MACHINE AND METHOD

The present invention relates to beam cutting machines and, more particularly, to beam cutting machines for large scale structural H-beams.

Large scale structrual H-beams of steel, on the order of 10 inches by 40 inches in cross-section, are used as the framing for multistory buildings. These beams are bolted and welded to one another in accordance with standard criteria defined by the American Institute of Steel Construction (ASCE). For example, the ASCE journal of the structural division, Volume 105, No. ST5, May 1980, contains information on the movement connections of beams to column webs beginning on page 1005. A standard configuration for the end of a beam may be defined as follows. The flanges are cut at a common angle to define two parallel angled cuts of constant width. The edge of the web is cut approximately $\frac{1}{2}$ inch inset from the flange edges with a vertical cut; and, a rat hole is developed in the web at each junction with the flanges.

The conventional procedure for cutting the end of a beam is that of doing so manually with cutting torches prior to erection. Such manual cutting may be performed in situ or at a facility removed from the construction site. Accuracy in manual cutting is a direct function of the skill and experience of the welder. Thus, variations in quality of the cuts are inherent. If the angled cuts are not smooth surfaced, voids during welding are likely to occur. Any such void jeopardizes the integrity of the weld and hence the integrity of the load bearing capability of the framework. Furthermore, manual cutting often produces a less than perfect straight edge of the cuts in the flanges and the web. Any jagged portion of an edge will increase the possibility of voids during welding of the end of the beam and will jeopardize the integrity and load bearing capability of the junction.

Determination of the existence of any voids within a weld can be made with relatively sophisticated equipment. Should a void be detected, a rewelding of the junction is mandatory. Such rewelding results in both delays and substantial added costs in erecting the building framework.

In an attempt to standardize the end cuts of large scale H-beams, at least two devices have been developed. A manually operated H-beam cutting machine usable in situ has been developed by the Koike Sanso Kogyo Company, Ltd. This device is attachable to the end of an H-beam by clamps. It includes cutting torch supporting guide means for manually manipulating movement of a single cutting torch. The cuts to be made are limited to 90 degree cuts in the flanges and in the web. Means are not provided for cutting the rat holes in the web. An extremely complex and expensive beam profiling machine has been developed by the Vernon Tool Company. This device includes a complex robotic system for manipulating a cutting torch in response to cuts programed into a computer. The device includes a substantial superstructure for supporting and manipulating the cutting torch and requires that all beams to be cut be brought to the machine erected at a fixed location.

It is therefore a primary object of the present invention to provide a semiautomatic machine for cutting the ends of large scale H-beams to a standard configuration.

Another object of the present invention is to provide a semi-automatic machine for developing the end cuts of two large scale H-beams from a single beam.

Yet another object of the present invention is to provide a machine for simultaneously cutting the flanges of a large scale H-beam.

Still another object of the present invention is to provide a machine for automatically cutting in one operation the rat holes and edge in the web of a large scale H-beam.

A further object of the present invention is to provide a machine for accurately cutting large scale H-beams which have non-parallel flanges.

A yet futher object of the present invention is to provide a machine for cutting to specification the end of a large scale H-beam and for die cutting holes in the web of the beam.

A still further object of the present invention is to provide a method for accurately cutting the end of a large scale H-beam to specification.

A still further object of the present invention is to provide a method for cutting the end of a large scale H-beam to a predetermined configuration and for die cutting the web of the beam.

These and other objects of the present invention will become apparent to those skilled in the art as the description thereof proceeds.

The present invention may be described with greater specificity and clarity with reference to the following drawings, in which:

FIG. 1 is an isometric view of the major components of the present invention;

FIG. 2 illustrates a swing arm for cutting the web in a beam;

FIG. 8 illustrates the movement of the cutting torches;

FIG. 9 illustrates the end of an H-beam cut to specification;

FIG. 10 illustrates the movement of the web cutting torch for cutting two beam ends from a single beam;

FIGS. 11 and 12 illustrate the means for attaching the end of a horizontal beam to a vertical beam;

FIG. 15 is an isometric view of a die cutting machine usable in combination with the beam cutting apparatus illustrated in FIG. 1;

FIG. 16 is a partial top view of the die cutting apparatus;

FIG. 17 illustrates a track for the die cutting apparatus;

FIG. 18 is a frontal view of the punch; and

FIG. 19 is a side view of the punch.

Figure 3:
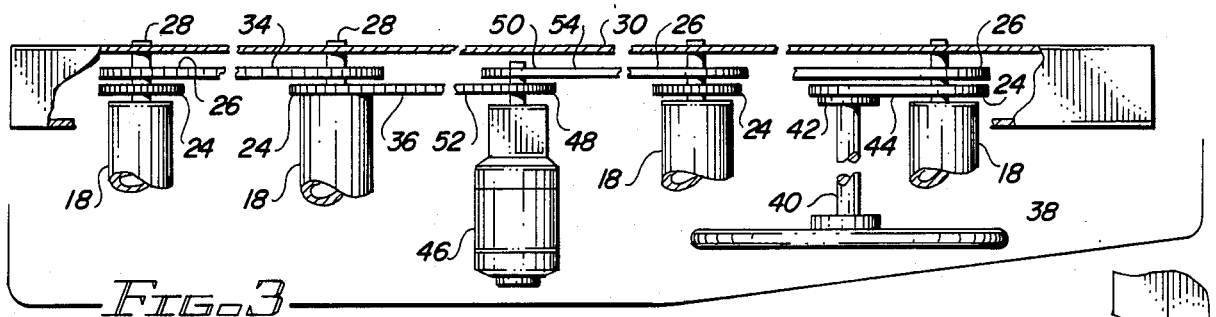
FIG. 3 illustrates apparatus for rolling an H-beam along a conveyor table.

Referring to FIG. 1, there is shown a conveyor table 10 for conveying the work piece to superstructure 12 which supports various cutting torches and a conveyor table 14 for receiving the work piece. Conveyor table 10 includes a frame 16 of appropriate width, length and structural rigidity to support a large scale H-beam which may be on the order of 16 by 40 inches in cross section and 1 to 60 feet long. A plurality of rollers 18 are rotatably mounted in frame 16 to provide a rolling surface for the workpiece transported along conveyor table 10. Similarly, conveyor table 14 includes a frame 20 supporting a plurality of rollers 22 for conveying the workpiece thereon.

Referring jointly to FIGS. 1 and 3, the apparatus for transporting the workpiece along each of the conveyor tables will be described; although the description will be with primary reference to table 10, it is to be understood that similar structures may be incorporated in table 14. Each of rollers 18 includes a pair of sprockets 24, 26 mounted upon a shaft 28 common to both the roller and the sprockets. Each of shafts 28 is rotatably journaled within longitudinal members 30, 32 of frame 16. A chain 34 interconnects adjacent sprockets 26 of alternate pairs of rollers 18 and further chain 36 interconnects adjacent sprockets 24 of alternate pairs of rollers 18. Accordingly, rotational movement of one roller is translated through the respective sockets and chains to every other roller. A hand wheel 38 mounted upon a journaled shaft 40 includes a sprocket 42. A chain 44 interconnects sprocket 42 with a sprocket of one of the rollers, such as sprocket 24 as illustrated. Rotation of hand wheel 42 will produce a commensurate rotation of all of rollers 18 and produce translation of any work piece mounted upon the rollers.

Primarily, hand wheel 38 is used for final manual repositioning of the workpiece with respect to the cutting torches mounted on superstructure 12.

For primary movement of a roller along conveyor table 10, a rotational power source 46 may be employed. This power source may be electrically or hydraulically operated. It includes one or more sprockets 48, 50 interconnected by chains 52, 54 to sprockets 24, 26 of adjacent rollers. Switch means 56 mounted upon frame 16 may be incorporated to energize power source 46. Power source 46 is energized to transport the workpiece on to and off of conveyor table 10. Clamps 58, 60 are present in each of conveyor tables 10 and 14. These clamps clamp a flange of the workpiece against longitudinal member 30. The clamps may be mechanically, pneumatically or hydraulically actuated. Conveyor table 14 is a functional dupliclate of conveyor table 10; accordingly, the duplicate and equivalent structure illustrated in FIG. 3 and described above with respect to conveyor table 10 may be incorporated in conveyor table 14.

Figure 4:
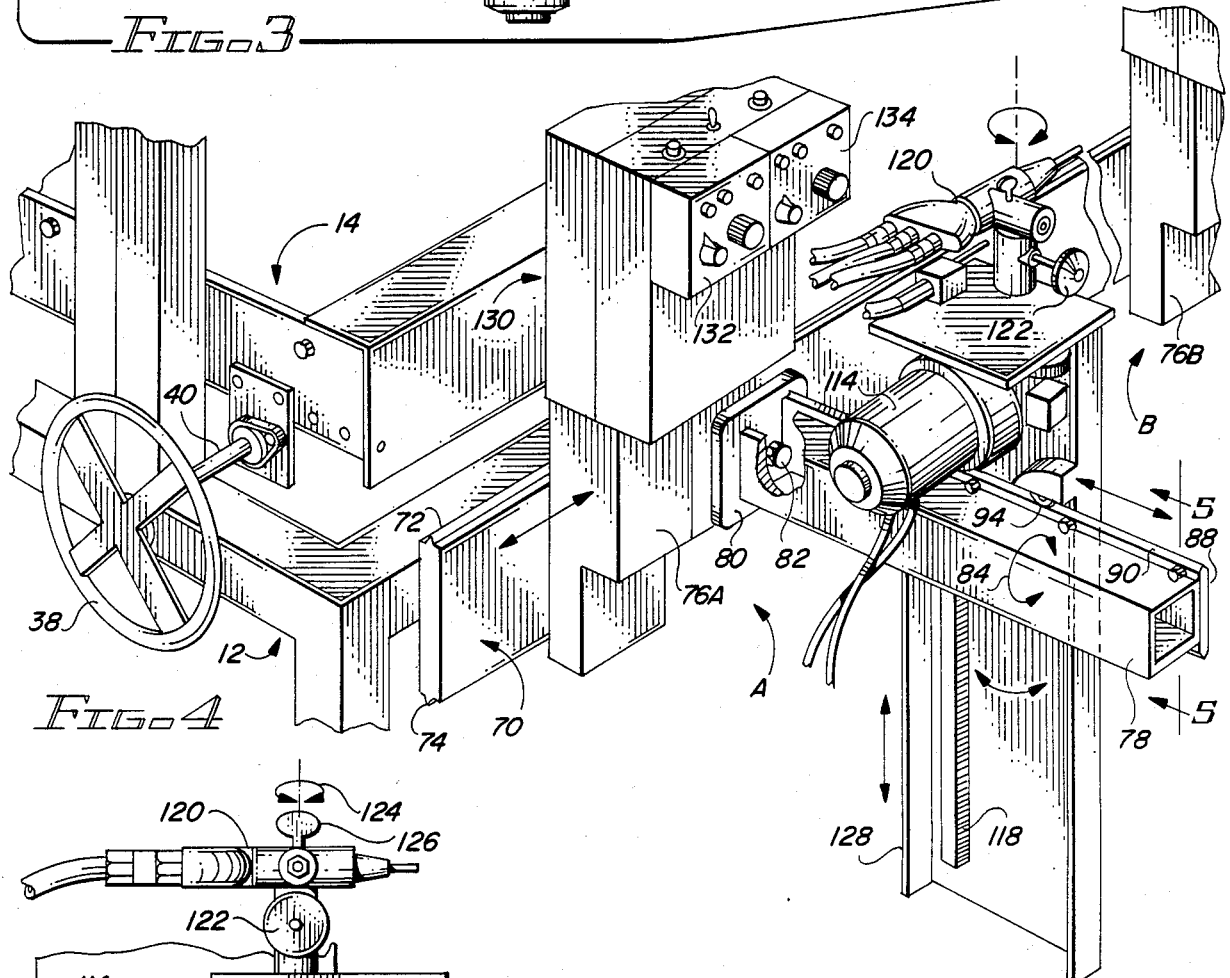
FIG. 4 illustrates the adjustable features of one of the cutting torch assemblies.

As illustrated in FIG. 4, superstructure 12 includes a guide 70 rigidly attached thereto and extending thereacross. This guide supports each of the opposed cutting torches and the support apparatus therefor and permits movement therealong of the cutting torches, as will be described in more detail below. To ensure accurate translation of the cutting torches along the guide and essentially preempt any and all wobble or looseness of fit and yet permit rectilinear translated movement, tracks 72, 74, triangular in cross section, are formed along the upper and lower edges, respectively, of the guide. The cutting torch on the near side, cutting torch assembly A, includes a robust housing 76A. The housing includes pulley like rollers rotatably mounted in opposed relationship to engage tracks 72 and 74 and capture guide 70 therebetween. The number and location of such rollers are commensurate with the degree of rigidity necessary to support the apparatus attached to and suspended from housing 76A. Housing 76B is also shown and is respresentative of cutting torch assembly B.

Figure 5:
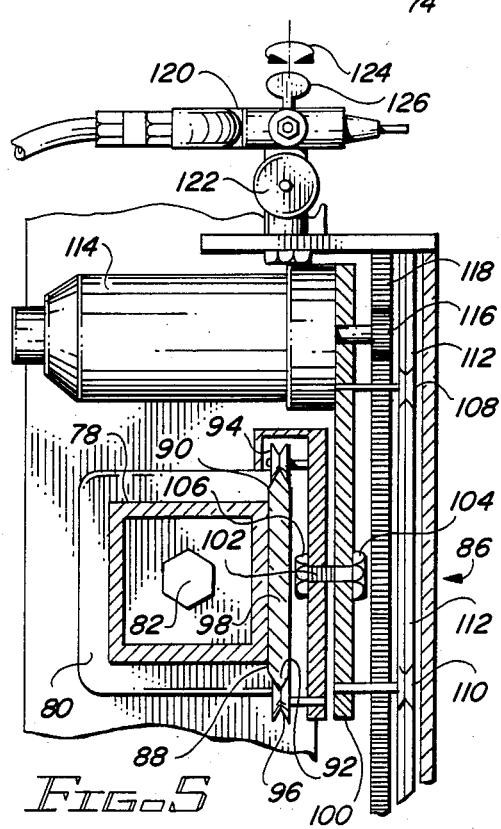
FIG. 5 is a cross sectional view taken along lines 5—5, as shown in FIG. 4.

Referring jointly to FIGS. 4 and 5, a bar 78 extends from a footing 80, which footing is secured to housing 76A by bolt 82. By losening and retightening bolt 82, the angular orienatation of bar 78 about its longitudinal axis may be adjusted, as represented by arrow 84. Such angular orientation permits the cutting torch to travel equidistant from and across the flange of the beam to be cut even if the flange is not perpendicular to the beam.

A vertical support member 86 is translatable secured to bar 78. A guide 88 is ridigly secured along one vertical side of bar 78. The guide includes tracks 90, 92 formed along the opposed longitudinal edges. These tracks may be triangular in cross section as illustrated. Opposed rollers 94, 96 are rotatably secured to a plate 98 for capturing therebetween tracks 90, 92 of guide 88. By appropriate positional adjustment, these rollers can be mechanically fitted to the tracks to essentially preclude any and all wobble between bar 78 and plate 98. Yet, translation of the plate along bar 78 is readily accomodatable by the rolling engagement between rollers 94, 96 and guides 90, 92.

A support plate 100 is secured to plate 98 by angular adjustment means 102, such as nut 104 and bolt 106. The angular adjustment means permits rotation of support plate 100 with respect to plate 98 and the positioning of support plate 100 at any fixed angle with respect to plate 98.

Such repositioning permits the cutting torch to be set to travel at a predeterminable angle across the flange of the beam to be cut. The support plate includes a plurality of opposed rollers on opposed sides of vertical support member 86 and of which only rollers 108 and 110 are illustrated. These rollers engage opposed tracks attached to the vertical support plate 86 is capable of translatory movement may be effected by electric motor 114 rotatable energizing pinion gear 116. The pinion gear is in meshing engagement with a rack 118 secured to vertical support member 86. Energization of motor 114, commensurate rotation of pinion gear 116 through engagement with rack 118, will raise or lower vertical support member 86. The vertical support member supports cutting torch 120. Thus, the cutting torch is translatable across the flange of the beam to be cut by energization of motor 114.

The cutting torch is secured to positioning means 122 for adjustably rotating the cutting torch about a vertical axis as indicated by arrow 124. Thereby, the angle of the cut to be made by the cutting torch is settable by positioning means 122. Securing means 126 may be incorporated to selectively remove the cutting torch for maintainance or repair purposes. A shroud 128, as illustrated in FIG. 4, may be employed to protect the various rollers, tracks and gears associated with the horizontal and vertical translatory movements and angular positioning of cutting torch 120.

Figure 6:
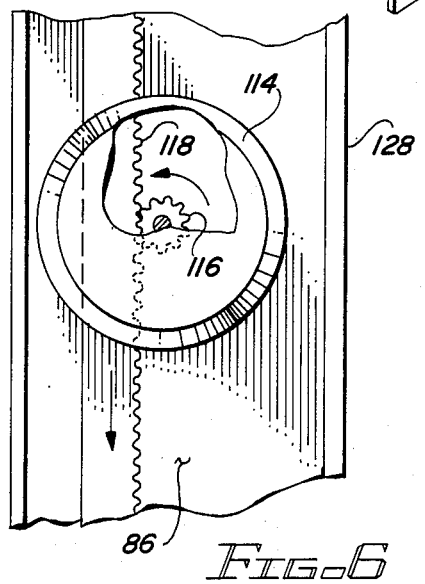
FIG. 6 is a partial view illustrating vertical adjustment of the torch support frame.

The above description has been made with primary reference to cutting torch assembly A; cutting torch assembly B, located upon guide 70 on the other side of superstructure 12 and representatively illustrated by housing 76B is essentially a mirror image thereof. It is to be understood that housing 76B is supported by guide 70 in the same manner as housing 76A. Furthermore, the various other mechanisms and features illustrated in detail in FIGS. 4, 5 and 6 with respect to cutting torch assembly A are incorporated in cutting torch assembly B except that the apparatus attendant cutting torch assembly A in order for it to cut the flange on the far side of the H-beam. To assist an operator, who is usually located in proximity to control box 130, to ensure proper operation of the cutting torch of cutting torch assembly B, a mirror (not shown) may be employed.

The control for each of cutting torch assemblies A and B is effected by controls located upon control box 130. In example, control unit 132 may incorporate the controls necessary for cutting torch assembly A while control unit 134 includes the controls necessary for cutting torch assembly B. As illustrated, control box 130 may be attached to and extend from housing 76A.

Referring jointly to FIGS. 1 and 2, overhead support structure 150 for web cutting torch 152 will be described. Articulated swing arm 154 is secured to the approximate center of horizontal member 156 of superstructure 12 by rod 158 pivotally secured to and retained by boss 160. Arm 162 of articulated swing arm 154 is secured to rod 158 by clamp means 164. Arm 166 of the articulated swing arm is pivotally securedto arm 162 by pivot means 168. Arm 166 may be bifurcated, as illustrated, into lower and upper segments 170, 172, respectively. The lower segment supports cutting torch 152 and the various gas lines 174 associated therewith. The upper segment includes an electric motor 176 for rotatably driving a serated cylinder 178 mounted upon a shaft 180 through a reduction gear 182.

Torch 152 performs cuts in the web of the H-beam through transport of the torch by movement of articulated swing arm 154, as will be described with joint reference to FIGS. 1 and 2. First and second stanchions 190, 192 extend upwardly from horizontal member 156. Stanchion 190 includes a bracket 194 extending horizontally therefrom and is vertically adjustable in height through adjustment means 196. Bracket 198 extends from stanchion 192 and is also vertically adjustable through adjustment means 200. An extendable rod 202 is secured to bracket 194 by clamp 204. A further rod 206 extends from bracket 198 and is secured thereto by clamp 208. A pin 210 extends downwardly from vertical adjustment means 212 secured to rod 202. Similarly, pin 214 extends downwardly from vertical adjustement means 216 secured to rod 206. Pins 210 and 214 support guide 218. The guide includes opposed vertical surfaces 220, 222, which surfaces may be serated.

Serated roller 178 actuated by motor 176 bears against one of surfaces 220, 222. Upon rotation of the serated roller, upper segment 172 will be drawn therealong and result in angular and pivotal movement of articulated swing arm 154. Since torch 152 will be repositioned equivalent to that of upper segment 172, guide 218 serves in the manner of a template to guide the cut being made by torch 152.

Figure 7:
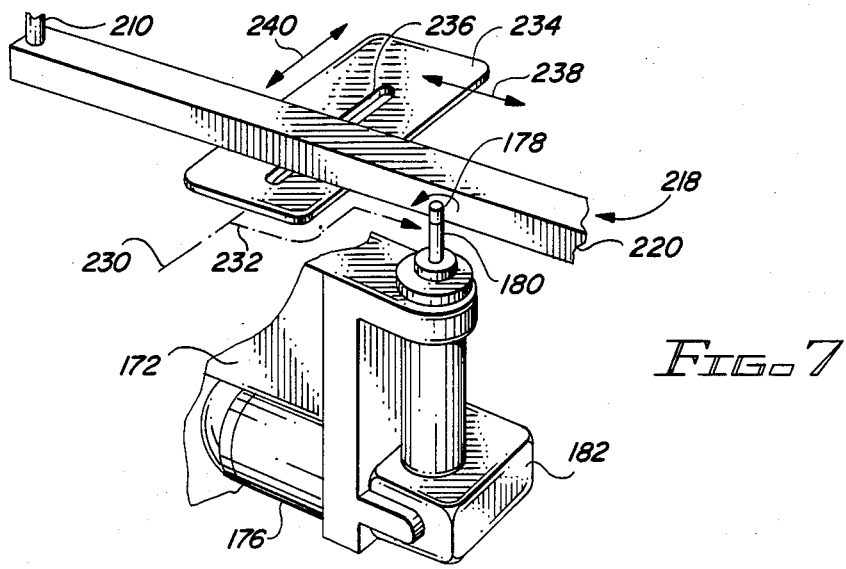
FIG. 7 illustrates the template follower of the swing arm shown in FIG. 2.
Figure 13:
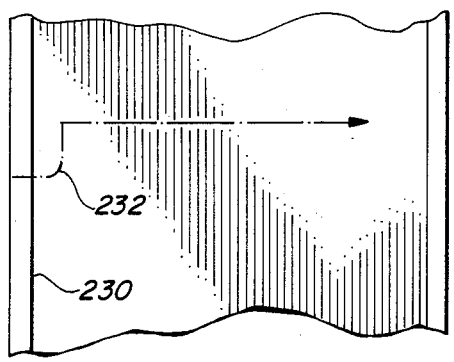
FIG. 13 illustrates a part of the path followed by a cutting torch across the web.

Referring to FIGS. 7 and 13, there is illustrated the versatile capability of guide 218 functioning as a template. Line 230 is representative of a junction between a flange and the web of an H-beam. Dash line 233 is representative of one of the rat holes to be cut in the web and a portion of the edge to be cut in the web. A plate 234 is secured to the underside of guide 218. The means for securing the plate may include a downwardly extending threaded bolt having its head captured within a slot in the undersurface of guide 218 for penetrable engagement with slot 236 in the plate; a wing nut or other nut may be employed to lockingly secure the plate to the guide at a predetermined location along the guide and at a predetermined protrusion of the guide past surface 220. Thereby, plate 234 is positionable along and laterally with respect to the guide as indicated by arrows 238, 240.

In the position illustrated, the protrusion of plate 234 from surface 220 is commensurate with the depth of the rat hole represented by the dash line 232. Segment 172 of the articulated swing arm will be translated along the edge of plate 234 protruding from surface 220 by contact with and rotation of serated cylinder 178. For reasons expressed above, cutting torch 152 (see FIG. 2), cutting the web of the H-beam, will follow the path represented by the dash line 232 to cut the first rat hole in the web and the web edge. A plate similar to plate 234, may be secured further along guide 218 to direct roller 178 and torch 152 therearound to cut the second rat hole (not illustrated). It may be noted that the standard configuration of the end of a large scale H-beam requires that the edge of the web be one half inch inset from the edges of the adjacent flanges. The positional accuracy of the cut to form the edge is readily set by positioning guide bar 218 through extension or retraction of rods 202, 206 with respect to brackets 194, 198, respectively.

Referring to FIG. 8, there is shown the movement of the torches described above to obtain the nexessary cuts in an H-beam. Specifically, cutting torch assembly A travels upwardly along flange 250 of a large scale H-beam 252 to make the angled cut therein. As is well known to those skilled in the art, the torch is set against the lower edge of the flange to pre heat it before the cutting operation is commenced. Accurate setting of the cutting torch this purpose is available from the control system 130 described above. Simultaneously, cutting torch assembly B performs the cut in flange 254 from the bottom to the top. After these cuts have been made, torch 52 is brought into operation to cut the edge and the two rat holes in the web 256 of beam 252. This cut is made through use of guide 218 in combination with two of plates 234 attached thereto to define the size and location of the two rat holes. Torch 152 travels from right to left in the view illustrated in FIG. 8; however, the movement may be reversed by reversing the direction of rotation of serated roller 178.

The cuts performed as illustrated in FIG. 8 produce a configuration for the end of a large scale H-beam 152 as illustrated in FIG. 9. By using a controlled and regulated upward movement of each of cutting torch assemblies A and B, smooth surfaced parallel cut surfaces 258, 260 in flanges 250, 254, respectively are obtained. Such smooth surfaces tend to discourage the formation of voids in welds used to attach the ends of the flanges to an adjacent beam. The end of the H-beam illustrated in FIG. 9 also depicts rat holes 262, 264 and edge 266 formed in web 256. As pointed out above, edge 266 is, in accordance with industry standards, inset one half inch from the terminal edges of flanges 250, 254.

Referring to FIG. 10, there is shown a large scale H-beam 270 which is to be cut to form the ends of two beams. First, H-beam 270 is set upon conveyor tables 10, 14 at an appropriate location commensurate with the length of at least one of the beams to be cut. Thereafter, cutting torch assemblies A and B are energized to make cuts 272, 274 in flanges 276, 278. On completion of these cuts, guide 218 is positionally located and plates 234 are added thereto at the appropriate locations to cut both the edge and the rat holes in the web of at least one of the H-beams to be severed. The path to be traced by cutting torch 252 is depicted by dashed line 280. This path will produce a straight cut across the web of H-beam 282 and a pair of rat holes 284, 286 and inset edge 288 in web 290 of H-beam 292.

Referring to FIGS. 11 and 12 jointly, there is illustrated a conventional industry standard procedure for attaching an horizontal H-beam to the flange of a vertical H-beam. The profiled end of H-beam 252 is located adjacent flange 300 of a vertical H-beam 302. A backup bar 304 is penetrably located within rat hole 262 and essentially adjacent the lower surface of flange 250. Flange 250 is welded to flange 300 by a weld interconnecting cut surface 252 and the corresponding surface of flange 300. The backup bar assists in performing this welding operation. Similarly, a weld 306 is developed between cut surface 260 of flange 254 and the corresponding surface of flange 300. Web 256 is secured to beam 302 via a plate 308 welded to and extending from flange 300. The plate is bolted to web 256 by nut and bolt fastening means 310. It is understood that apertures 312 and 314 will have been die cut or otherwise formed in web 256 prior to the positioning of H-beam 252 against H-beam 302.

Figure 14:
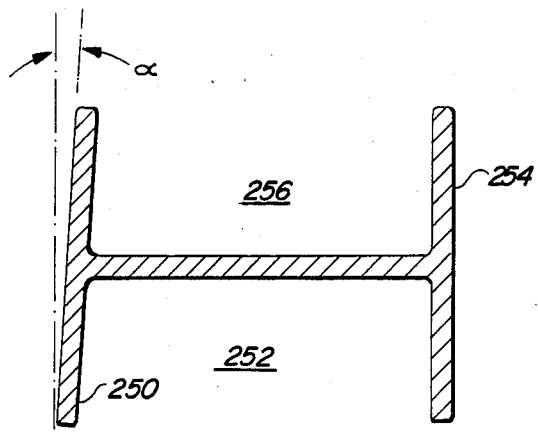
FIG. 14 illustrates a beam having a nonperpendicular flange.

FIG. 14 illustrates a not unusual condition of H-beam 252 wherein flange 250 is other than perpendicular to beam 256. To accomodate such variation in angulation of flange 250, cutting torch assembly A, as illustrated in FIGS. 4 and 5, is adjusted to compensated for the non-perpendicularity of the flange. Such adjustment is effected by loosening nut 82 to permit rotation of bar 78 to an angle equivalent to the angle of inclination alpha ($\alpha$) of flange 250. After bolt 82 is loosened, the angle can be readily duplicated by placing vertical support member 86 adjacent the flange and in such position, tightening bolt 82. The resulting cut surface will be cut at the appropriate angle and the cut surface will have the required width.

As depicted in FIG. 11, apertures 312 and 314 are formed in web 256 of H-beam 252 prior to securing of same to another beam during assembly of a building framework. Previously, such apertures have been cut by a cutting torch in an operation subsequent to that of profiling the beam ends. Referring jointly to FIGS. 15 to 19, there is shown a die cutting apparatus suitable for use in conjunction with conveyor table 14 (see FIG. 1) whereon the profiled H-beams are transported after profiling. That is, the hole die cutting machine to be described may be added as a station usable in conjunction with conveyor table 14 to die cut apertures 312 and 314 in the H-beam after profiling.

The size and location of apertures 312, 314 are fixed by industry standards. Accordingly, it is therefore feasible to establish a template controlled die cutter to die cut the apertures in each beam. Die cutting machine 320 translatably mounted upon a pair of tracks 322, 324 through pulley-like wheels 326 for engaging and being retained by the tracks. The use of the tracks permits the machine to be wheeled out of the way when it is not needed. By incorporating a jig or template 328 fixed to the floor in a predetermined relationship to the H-beams secured to conveyor table 314, the die cutting mahcine can be brought into registration with the H-beam for accurately die cutting holes 312, 314. The die cutting machine includes a massive hydraulic unit 330 for providing translatory movement and power to punch 332. A workpiece support table 332 supports a die 336. The hydraulic unit along with the table may be raised or lowered commensurate with the height of the workpiece by means, such as crank 338 connected to appropriate gearing mechanisms. A handle 340 is pivotally connected to frame 342 through a pivot junction 344. It is to be understood that frame 342 supports both hydraulic unit 330 and table 334. Handle 340 includes a positioning pin 346 extending downwardly therefrom. Template 328 secured to a fixed location with respect to the die cutting machine includes a plurality of apertures 348, each of which is representative of a work position of the die cutting machine. Alternatively, template 328 may be configured with clamps to removably receive and retain a plate (not shown) which incorporates variously positioned apertures for engagement by pin 346. With the latter arrangement, greater versatility is provided in positioning the die cutting machine with respect to different sized workpieces and wherein differently sized and/or located holes are to be cut.

In operation, a profiled H-beam is conveyed along conveyor table 14 to locate web 256 adjacent die 336. This may be accomplished by relocating the H-beam or, preferably by translating the die cutting machine as indicated by arrow 350 to bring the machine into operative engagement with the H-beam. Once located by manipulation of handle 340 to place 328, the die cutting machine is actuated to punch the required hole(s) in web 256.

I claim:

1. Apparatus for profiling the end of a structural H-beam having opposed flanges interconnected with a web, said apparatus comprising in combination:
   (a) means for locating the beam to be profiled;
   (b) first and second cutting torches for cutting the opposed flanges;
   (c) a third cutting torch for cutting the web;
   (d) means for supporting each of said first and second cutting torches;
   (e) means for rectilinearly translating said first and said second cutting torches across the respective one of the opposed flanges to profile the edges of the flanges;
   (f) means for setting the angle of cut of each of said first and second cutting torches in any of three planes;
   (g) means for translating said third cutting torch across the web to profile the edge of the web;
   (h) means for guiding said third cutting torch on a predetermined path along the web during operation of said translating means; and
   (i) means for controlling the operation of said first, second and third cutting torches.

2. The apparatus as set forth in claim 1 including means for positioning said first and second cutting torches on opposed sides of the beam.

3. The apparatus as set forth in claim 2 wherein said supporting means, said rectilinear translating means and said setting means for each of said first and second torches are configured as essentially mirror images of one another.

4. The apparatus as set forth in claim 2 wherein said positioning means includes means for repositioning said first and second cutting torches toward and away from one another to accomodate different width beams.

5. The apparatus as set forth in claim 1 wherein said rectilinear translating means comprises a motor and gear means associated with each of said first and second cutting torches.

6. The apparatus as set forth in claim 1 wherein said setting means for each of said first and second cutting torches includes means for tilting said rectilinear translating means of the respective one of said first and second cutting torches in a plane parallel to the longitudinal axis of the beam.

7. The apparatus as set forth in claim 6 wherein said setting means for each of said first and second cutting torches includes means for pivoting said rectilinear translation means of each one of said first and second cutting torches in a plane parallel to the lateral axis of the beam.

8. The apparatus as set forth in claim 7 wherein said setting means for each of said first and second torches includes means for rotating the respective one of said first and second cutting torches about an axis perpendicular to the axis of the flame of the prespective first and second cutting torches.

9. The apparatus as set for th in claim 1 wherein said setting means for each of said first and second cutting torches includes means for pivoting said rectilinear translation means of each one of said first and second cutting torches in a plane parallel to the lateral axis of the beam.

10. The apparatus as set forth in claim 1 wherein said setting means for each of said first and second torches includes means for rotating the respective one of said first and second cutting torches about an axis perpendicular to the axis of the flame of the prespective first and second cutting torches.

11. The apparatus as set forth in claim 1 wherein said translating means includes an articulating arm.

12. The apparatus as set forth in claim 11 wherein said guiding means includes a guide and at least one detachably attachable template attached to said saw guide.

13. The apparatus as set forth in claim 1 including die cutting means for die cutting at least one hole in the web of the beam.

14. The apparatus as set forth in claim 13 including means for placing said die cutting means at a predetermined location with respect to the edge of the web subsequent to the cutting of the edge of the web.

15. The apparatus as set forth in claim 1 wherein said locating means includes means for locking the beam in place.

16. A method for profiling the end of a structural H-beam having opposed flanges interconnected with a web, said method comprising the steps of:
 (a) locating the beam to be profiled;
 (b) cutting the opposed flanges with first and second cutting torches to profile the edges of the flanges;
 (c) cutting the web with a third cutting torch to profile the edge of the web;
 (d) supporting the first and second cutting torches;
 (e) rectilinearly translating the first and second cutting torches across the respective ones of the opposed flanges to cut the respective ones of the opposed flanges;
 (f) setting the angle of cut of each of the first and second cutting torches in any of three planes;
 (g) translating the third cutting torch across the web to cut the web;
 (h) guiding the third cutting torch on a predetermined path along the web during operation of said translating step; and
 (i) controlling the operation of the first, second and third cutting torches.

17. The method as set forth in claim 16 including rectiliniear translating means associated with each of the first and second cutting torches for effecting said step of rectilinearly translating each of the first and second cutting torches and wherein said step of setting for each of the first and second cutting torches includes the step of tilting the rectilinear translating means of the respective ones of the first and second cutting torches in a plane parallel to the longitudinal axis of the beam.

18. The method as set forth in claim 17 wherein said step of setting includes the step of pivoting the rectilinear translating means of the respective one of the first and second cutting torches in a plane parallel to the lateral axis of the beam.

19. The method as set forth in claim 18 wherein said step of setting includes the step of rotating the respective one of the first and second cutting torches about an axis perpendicular to the axis of the flame of the respective first and second cutting torches.

20. The method as set forth in claim 16 including the step of die cutting with a die cutter at least one hole in the web of the beam subsequent to said guiding step.

21. The method as set forth in claim 20 wherein said step of diecutting includes the step of placing the die cutter at a predetermined location with respect to the edge of the web subsequent to said step of translating.

22. A method for profiling the end of a structural H-beam having opposed flanges interconnected with a web, said method comprising the steps of:
 (a) locating the bean to be profiled;
 (b) cutting the opposed flanges with first and second cutting torches to profile the edges of the flanges;
 (c) cutting the web with a third cutting torch to profile the edge of the web;
 (d) supporting the first and second cutting torches;
 (e) rectilinearly translating the first and second cutting torches across the respective ones of the opposed flanges to cut the respective ones of the opposed flanges, including the step of repositioning the first and second torches toward and away from one another to accomodate different width beams;
 (f) setting the angle cut of each of the first and second cutting torches in any of three planes;
 (g) translating the third cutting torch across the web to cut the web;
 (h) guiding the third cutting torch on a predetermined path along the web during operation of said translating step; and
 (i) controlling the operation of the first; second and third cutting torches.

* * * * *